March 20, 1956  A. H. FISKE, JR., ET AL  2,738,671

PNEUMATIC FATIGUE TESTING DEVICE

Filed Nov. 17, 1953

Inventors:
Augustus H. Fiske, Jr.
Dana A. Morley
by Vernon F. Kalb
Their Attorney.

United States Patent Office 2,738,671
Patented Mar. 20, 1956

2,738,671

PNEUMATIC FATIGUE TESTING DEVICE

Augustus H. Fiske, Jr., Ipswich, Mass., and Dana A. Morley, Cincinnati, Ohio, assignors to General Electric Company, a corporation of New York Application November 17, 1953, Serial No. 392,574

6 Claims. (Cl. 73—67)

This invention relates to a resonant vibration testing apparatus and more specifically to a pneumatic fatigue testing device for cantilever mounted specimens such as gas turbine buckets, impeller blades and the like.

Vibration testing apparatus employing magnetic excitation to force vibrations is not satisfactory when non-magnetic material is involved. Furthermore, it does not fulfill requirements for fatigue testing for magnetic materials because the amplitude of vibrations is insufficient and can be used only for vibration testing at the first fundamental or bending frequency because of insufficient input energy at other frequencies.

The great disadvantage in the prior art pneumatic vibration testing systems is the amount of losses due to the standing wave reflections as air is fed into a resonant chamber normal to the resonant air column.

It is an object of this invention to provide an improved pneumatic testing device for determining the resonant frequencies of cantilever mounted specimens.

It is another object of this invention to provide an improved pneumatic fatigue testing apparatus for vibrating cantilever mounted specimens at resonant frequencies higher than the first bending mode.

Still another object of this invention is to provide an improved pneumatic testing apparatus which accommodates the test specimen so that the vibrational characteristics of the test specimen are unchanged by the test apparatus.

A further object of this invention is to provide an improved resonant vibration testing apparatus which can be used with all kinds of materials and which is simple to construct and economical to maintain.

These and other objects of this invention will become more apparent by reference to the following description taken in conjunction with the accompanying drawing which illustrates a preferred embodiment of this invention, but it will be understood that other modifications in specific structural details may be made within the scope of the appended claims without departing from the spirit of this invention.

Figure 1:
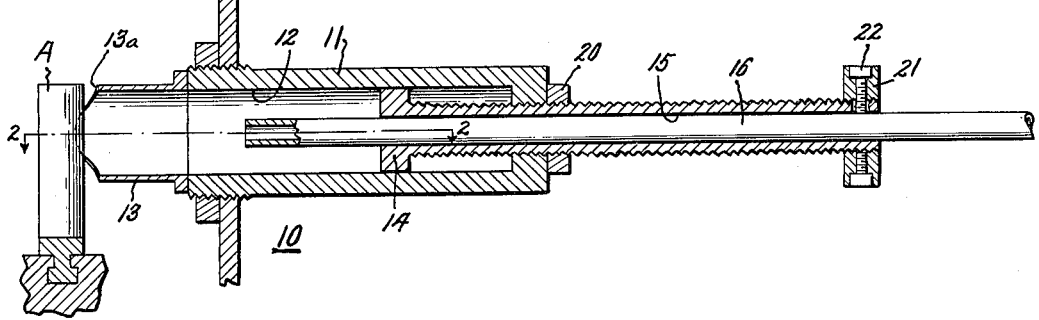
Figure 1 is a sectional view of a testing device illustrating this invention.
Figure 2:
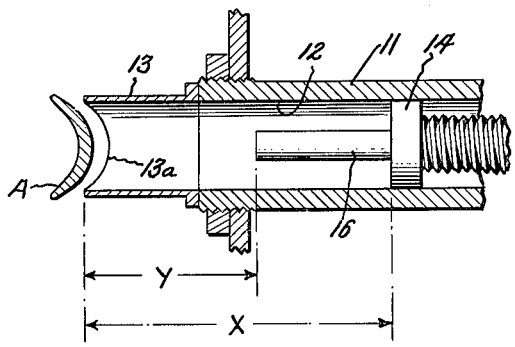
Figure 2 is a fragmentary sectional view at right angles to the view of Figure 1.

In accordance with this invention, accurately timed impulses produced by interrupting a high pressure air blast impinges the free end of a cantilever mounted device being tested. The accurately timed impulse is obtained by providing a testing device having a hollow cavity, the length of which may be adjusted to obtain a sharply tuned standing wave column of air, and providing for the input of pressurized air at a nodal point of the standing wave. The test specimen is closely spaced to the discharge nozzle of the testing device, and the impulses of air provide the excitation energy during their escape between the nozzle and the specimen.

Referring to the drawing, there is disclosed a novel pneumatic fatigue testing device indicated generally at 10, with a specimen A, whose vibration characteristics are to be investigated. While specimen A may be cantilever mounted in any manner so long as its free end is aligned with the pneumatic testing device 10, it is desirable that it be mounted in the identical manner to that which it is in use. The testing device 10 comprises a tubular body 11 provided with a cylindrical bore 12 and a nozzle 13 at one end shaped as at 13a to conform to the specimen to be tested.

Within the bore 12 of the tubular body 11 is an axially movable piston 14, which is adjustable with respect to the end of the nozzle portion so that the dimension marked X can be varied to suit particular requirements as hereinafter described. Piston 14 is threaded with respect to the tubular body 11 of the testing device and is provided with a nut 20 to lock piston 14 in any adjusted position. Piston 14 in turn is provided with a central bore 15 in which an axially slidable supply tube 16 is positioned. Tube 16 can be moved axially to vary the dimension marked Y. A ring 21 is provided at the outer end of piston 14 and is provided with a radial hole in which screw 22 is placed to secure supply tube 16 in its adjusted position.

In operation, a pressurized fluid, preferably air, is supplied to the supply tube 16 and the position of piston 14 is adjusted until maximum response of the specimen under investigation is obtained. By maximum response is meant maximum amplitude of vibration, which can be determined visually, but can be more accurate by an optical indicating device. With the piston so adjusted, the dimension X will be approximately ½ the wave length of a standing wave air column in bore 10 of tubular body 11 corresponding to the natural frequency of vibration of the specimen under test. The position of the slidable tube 16 is then adjusted with respect to piston 14 to obtain an increased response, at which time the dimension Y will be approximately ¼ of the wave length corresponding to the vibrational frequency.

This construction provides for accurately tuned impulses by interrupting a high pressure air blast through the use of a sharply tuned standing wave air column. Moreover, by positioning the end of inlet tube 16 at a node in the standing wave chamber, the standing wave losses in tube 16 are eliminated. While the pressure of the input fluid will vary with the particular specimen under test, it has been found that 90 p. s. i. is satisfactory for a non-magnetic steel turbine blade ¼" in thickness by 4" long and 2" wide.

Thus, it will be apparent that this invention provides a pneumatic testing device wherein there is no mechanical connection between the specimen and the excitation forces causing its vibration during testing. It will also be seen that by varying the dimensions X and Y a resonant air column providing a standing wave is set up in the cavity in the tubular body 11 which is variable in frequency, so that the specimen may be tested at its resonant frequency or at any higher mode vibration which may occur in use. In addition, the chamber formed by cylindrical bore 12 can be adjusted for precise tuning of excitation frequency.

Although a particular embodiment of this invention has been illustrated and described, modifications will occur to those skilled in the art without departing from the scope of the appended claims, and it is intended that the disclosure be interpreted as illustrative and not limitative.

What we claim as new and desire to secure by Letters Patent of the United States is:

1. In a vibration fatigue testing device, the combination of means for holding a specimen whose vibration characteristics are to be investigated, means for directing pneumatic fluid against said specimen comprising a tubular body having a nozzle head directed toward the specimen, a piston housed within said body and axially movable with respect to said nozzle head to define with said tubular body a vibration chamber of variable length, a fluid supplying tube having its outlet end within said chamber, said outlet end being axially adjustable with respect to said piston.

2. A pneumatic exciter for use in the vibration testing of a cantilever mounted specimen comprising a hollow member having a nozzle structure for directing pneumatic fluid against said specimen, a piston within said member presenting an apertured face toward said nozzle structure and defining with said hollow member a chamber of predetermined length, said piston being axially slidable to vary said chamber length, and a fluid supplying tube slidably mounted in said apertured face whereby said tube may be adjusted to extend into said chamber a distance of approximately one-half said chamber length to eliminate standing wave losses in said fluid supplying tube.

3. A pneumatic exciter for use in the vibration testing of a cantilever mounted specimen comprising a hollow member having a nozzle structure for directing pneumatic fluid against said specimen, a piston within said member presenting an apertured face toward said nozzle structure and defining with said hollow member a chamber having a length proportional to the frequency at which the specimen is to be tested, said piston being axially slidable to vary said chamber length whereby said specimen may be tested at higher mode frequencies, and a fluid supplying tube slidably mounted in said apertured face and having its outlet end extending to a nodal point in said chamber to eliminate standing wave losses in said fluid supplying tube.

4. In an apparatus for determining the natural frequency of vibration of a mounted object, a hollow member having an outlet nozzle for directing a fluid against said object, an apertured piston positioned within said hollow member and defining therewith a resonant chamber, and a supply tube slidably positioned in the aperture of said piston for conducting the fluid into said chamber, said piston being longitudinally movable within said hollow member to vary the length of said chamber whereby said length is proportional to the natural frequency of vibration of the object when the maximum response of the object is obtained.

5. A pneumatic exciter for use in the vibration and fatigue testing of a cantilever mounted object comprising a hollow member having a nozzle structure adapted to direct air against the object, an apertured piston movably positioned within said hollow member to define therewith an air chamber of variable length, and tubular means adapted for connection to a source of air slidably mounted within said piston to conduct air into said chamber.

6. A pneumatic fatigue testing apparatus for vibrating a cantilever mounted specimen comprising a tubular member having a nozzle at one end thereof adapted to direct a pressurized fluid against said specimen, a longitudinally movable piston having a central bore seated within said tubular member and defining therewith a vibration chamber of variable length, supply means for conducting the pressurized fluid into said chamber, said supply means being slidably mounted in said bore.

References Cited in the file of this patent
UNITED STATES PATENTS

| | | |
|---|---|---|
| 2,519,619 | Yellot et al. | Aug. 22, 1950 |
| 2,554,212 | Quinlan | May 22, 1951 |